UNITED STATES PATENT OFFICE.

JOHANNES JANSEN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

RED AZO DYE.

961,355.  Specification of Letters Patent.  Patented June 14, 1910.

No Drawing.   Application filed February 26, 1910.  Serial No. 546,042.

*To all whom it may concern:*

Be it known that we, JOHANNES JANSEN and WILHELM NEELMEIER, doctors of philosophy, chemists, citizens of the German Empire, residing at Leverkusen, near Cologne, Germany, have invented new and useful Improvements in Red Azo Dyes, of which the following is a specification.

Our invention relates to the manufacture and production of new coloring matters capable of dyeing on a mordant.

The new dyestuffs are obtained by combining the diazo compounds of ortho-aminophenol sulfonic acids with 1.3-dioxyquinolin.

The new dyestuffs are dark powders soluble in water generally with a red to bluish-red color and soluble in concentrated sulfuric acid generally with from an orange to red color. They yield upon reduction with stannous chlorid and hydrochloric acid, an ortho-aminophenol sulfonic acid and 1.3-dioxy-2-aminoquinolin.

The new dyes produce on wool yellow to red shades which turn red to bordeaux by chroming, shades fast to light and to fulling are thus obtained.

In carrying out our new process practically, we can proceed as follows, the parts being by weight:—18.9 parts of 2-aminophenol-4-sulfonic acid are diazotized by means of hydrochloric acid and 7 parts of sodium nitrite. The diazo compound is then added to an aqueous solution, which has to be stirred, until the combination is finished, of 20.5 parts of the disodium salt of 1.3-dioxyquinolin in an excess of sodium carbonate. The dyestuff is isolated in the usual way, filtered off, pressed and dried. It is a reddish-brown powder which is soluble in water with a red and which is soluble in concentrated sulfuric acid with an orange color. By reduction with stannous chlorid and hydrochloric acid 2-aminophenol-4-sulfonic acid and 1.3-dioxy-2-aminoquinolin are obtained. It dyes wool yellowish-brown turning red by chroming.

The process is carried out in an analogous manner on starting from other of the above mentioned ortho-aminophenol sulfonic acids, such as 6-chloro-2-aminophenol-4-sulfonic acid, 4-chloro-2-aminophenol-6-sulfonic acid, 6-nitro-2-aminophenol-4-sulfonic acid, 2-aminophenol-6-sulfo-2-carboxylic acid etc.

We claim:

1. The herein-described new azo dyestuffs, obtainable from ortho-aminophenol sulfonic acids and 1.3-dioxyquinolin, which dyestuffs are, after being dried and pulverized, dark powders soluble in water generally with a red to bluish-red color, soluble in concentrated sulfuric acid generally with an orange to red color; yielding upon reduction with stannous chlorid and hydrochloric acid, an ortho-aminophenol sulfonic acid and 1.3-dioxy-2-aminoquinolin; and dyeing wool from yellow to red shades turning red to bordeaux by chroming, substantially as described.

2. The herein-described new azo dyestuff, obtainable from 2-aminophenol-4-sulfonic acid and 1.3-dioxyquinolin, which dyestuff is, after being dried and pulverized, a reddish-brown powder soluble in water with a red color and soluble in concentrated sulfuric acid with an orange color; yielding upon reduction with stannous chlorid and hydrochloric acid 2-aminophenol-4-sulfonic acid and 1.3-dioxy-2-aminoquinolin; and dyeing wool yellowish-brown turning red by chroming, substantially as described.

In testimony whereof we have hereunto set our hands in the presence of two subscribing witnesses.

JOHANNES JANSEN. [L. S.]
WILHELM NEELMEIER. [L. S.]

Witnesses:
OTTO KÖNIG,
CHAS. J. WRIGHT.